United States Patent [19]

Guoli et al.

[11] Patent Number: 5,728,293
[45] Date of Patent: Mar. 17, 1998

[54] EXTERNAL FILTER ASSEMBLY FOR AQUARIUMS

[75] Inventors: Giacomo Guoli, Milan, Italy; Edmund J. Mowka, Jr., Mentor, Ohio

[73] Assignee: Aquarium Systems, Inc., Mentor, Ohio

[21] Appl. No.: 489,406

[22] Filed: Jun. 12, 1995

[51] Int. Cl.$^6$ ........................................ A01K 63/04
[52] U.S. Cl. .................... 210/151; 210/169; 210/203; 210/282; 210/285; 210/416.2; 210/903
[58] Field of Search ........................ 210/150, 151, 210/169, 198.1, 203, 264, 282, 285, 416.2, 661, 903

[56] References Cited

U.S. PATENT DOCUMENTS

| | | |
|---|---|---|
| 2,605,901 | 8/1952 | Morrisson et al. . |
| 3,327,859 | 6/1967 | Pall .......................... 210/502.1 |
| 3,386,231 | 6/1968 | Nutting . |
| 3,513,978 | 5/1970 | Newsteder ...................... 210/169 |
| 3,897,339 | 7/1975 | Arndt . |
| 4,036,756 | 7/1977 | Dockery ........................ 210/169 |
| 4,206,719 | 6/1980 | Faris ............................ 210/169 |
| 4,392,953 | 7/1983 | Cornelius et al. ............. 210/169 |
| 4,483,769 | 11/1984 | Sherman . |
| 4,512,885 | 4/1985 | Willinger . |
| 4,537,678 | 8/1985 | Thissen ........................ 210/150 |
| 4,602,996 | 7/1986 | Willinger . |
| 4,735,715 | 4/1988 | Willinger . |
| 4,783,258 | 11/1988 | Willinger et al. . |
| 4,820,410 | 4/1989 | Cavalcante . |
| 4,842,727 | 6/1989 | Willinger et al. . |
| 4,861,468 | 8/1989 | Willinger et al. . |
| 5,002,660 | 3/1991 | Sherman et al. ............. 210/169 |
| 5,006,246 | 4/1991 | Edwards et al. ............. 210/282 |
| 5,078,867 | 1/1992 | Danner . |
| 5,238,367 | 8/1993 | Ellis et al. . |
| 5,266,190 | 11/1993 | Tominaga .................... 210/169 |
| 5,282,961 | 2/1994 | Ellis et al. . |
| 5,290,436 | 3/1994 | Danner ........................ 210/169 |
| 5,453,183 | 9/1995 | Hoffa ........................... 210/150 |

*Primary Examiner*—Neil McCarthy
*Assistant Examiner*—Theodore M. Green
*Attorney, Agent, or Firm*—Renner, Otto, Boisselle & Sklar, P.L.L.

[57] ABSTRACT

External filter assembly for aquariums includes a filter chamber containing a mechanical and/or chemical filter and a functionally active filter upstream of the mechanical filter for actively filtering the water before the water is filtered by the mechanical filter. Fresh air is mixed with the aquarium water immediately upstream of the functionally active filter whereby the functionally active filter is directly exposed to both dissolved oxygen in the water and atmospheric oxygen mixed in the water which significantly improves both the efficiency and capacity of the filter in performing its active function. Both the mechanical/chemical filter and the functionally active filter are cartridge type filters, whereby either may be replaced without disturbing and/or affecting the operation of the other. Also, one type of active filter cartridge may be replaced with another for performing different active filtration functions, such as biological filtration, protein skimming, ultraviolet sterilization and denitrification.

29 Claims, 7 Drawing Sheets

EXTERNAL FILTER ASSEMBLY FOR AQUARIUMS

FIELD OF THE INVENTION

This invention relates generally, as indicated, to an external filter assembly for aquariums which combines mechanical and/or chemical filtration with biological or other active filtration functions.

BACKGROUND OF THE INVENTION

Tank mounted external filters are commonly used to both mechanically and chemically filter water in an aquarium during circulation of the water from the aquarium tank through the filter assembly and back to the tank.

A principal advantage of an external mounted filter over an internal aquarium filter is that an external filter is much easier to clean and maintain, and does not require any disturbance of the environment within the aquarium during cleaning and maintenance of the filter. Also, it is much easier to monitor the need for cleaning and/or maintenance of an external filter.

However, heretofore a major drawback of external filters has been that they were not very effective in providing biological or other active filtration functions along with the usual mechanical and/or chemical filtration. Also, when some biological filtration was provided, the biological filtration function was not preserved when the mechanical/chemical filters were replaced.

SUMMARY OF THE INVENTION

The present invention combines mechanical and/or chemical filtration with biological or other active filtration functions in a unique and efficient tank mounted external filter assembly.

In accordance with one aspect of the invention, an external filter assembly is provided that includes a biological or other active filtration function which is completely separate from and independent of the mechanical/chemical filter.

In accordance with another aspect of the invention, the biological or other active filtration function is located upstream of the mechanical/chemical filter.

In accordance with still another aspect of the invention, both the biological or other active filtration function and the mechanical/chemical filter are in the form of cartridge type filters, either of which may be replaced without disturbing and/or affecting the operation of the other.

In accordance with yet another object of the invention, the active filter is directly exposed to both dissolved oxygen in the water and atmospheric oxygen mixed in the water which significantly improves both the efficiency and capacity of the filter to perform its active function.

In accordance with another aspect of the invention, one type of active filter cartridge may be replaced with another for performing different active filtration functions, including, for example, biological (including but not limited to fluidized bed filtration), protein skimming, ultraviolet sterilization and denitrification.

In accordance with another aspect of the invention, where the active filter is a biological filter, the filter desirably includes areas of fast and slow moving water thus insuring ideal conditions for the full range of biological filtration organisms.

In accordance with another aspect of the invention, where the biological filter is a fluidized bed filter, a V-slot is desirably provided adjacent the bottom of the filter cartridge through which the water is pumped from one side to the other for suspending the filtration medium within the filter to provide a relatively high surface area for growth of filtering bacteria.

In accordance with another aspect of the invention, a mechanical and chemical filtration cartridge is provided that includes a unique baffle system between two layers of fabric for more evenly distributing activated carbon over substantially the entire height of the filter, thus assuring that more water will contact the activated carbon on every pass through the filter.

In accordance with another aspect of the invention, the filter assembly includes a venturi for injecting fresh air into the water immediately upstream of the active filter to provide a wet/dry action of directly exposing the active filter to both dissolved oxygen in the water and atmospheric oxygen mixed with the water.

In accordance with another aspect of the invention, the venturi includes an air valve that allows the venturi action to be turned off from the top of the filter assembly when desired to eliminate the noise caused by aeration.

In accordance with another aspect of the invention, the filter assembly includes a pump impeller housing that combines the functions of impeller holder and impeller cover with water intake and venturi action.

In accordance with another aspect of the invention, aquarium water is supplied to the filter assembly through a siphon tube in fluid communication with the impeller housing that may be removed for cleaning without having to remove the impeller housing or both the water siphon tube and impeller housing may be removed together as a unit in a single step for cleaning.

In accordance with another aspect of the invention, the water siphon tube includes a pair of spaced apart vertical legs interconnected by a horizontal leg on which is mounted a flow regulator for adjusting the water flow through the filter assembly.

In accordance with another aspect of the invention, the filter assembly includes an overflow or spillway having a bottom edge with turned up lip at or slightly below the water level in the tank to cause increased turbulence at the water surface.

In accordance with another aspect of the invention, the filter assembly includes a power unit for driving the pump impeller which is detachable from the filter assembly housing only when the impeller housing is removed thus preventing accidental removal of the power unit.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENTS

Figure 1:
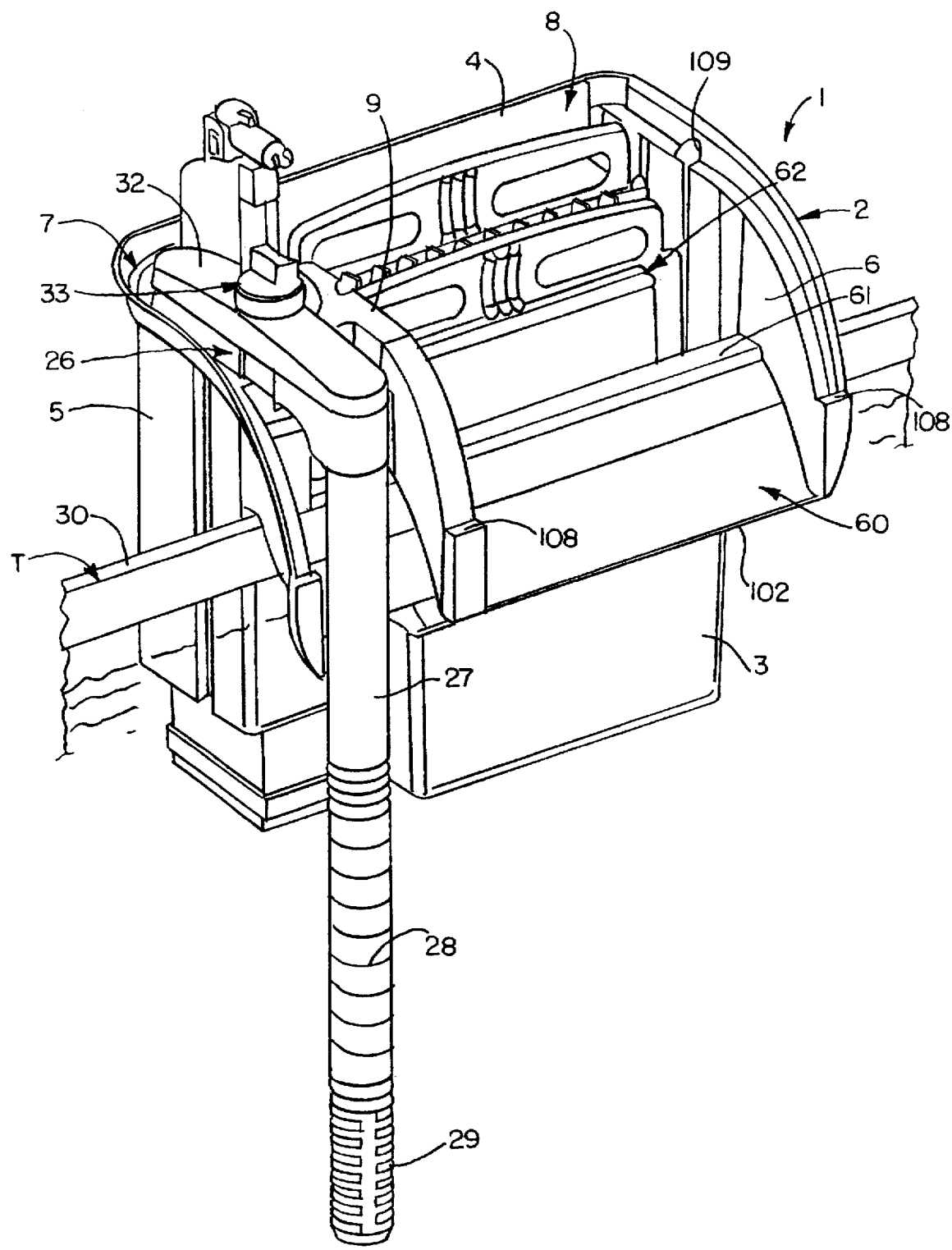
FIG. 1 is a perspective view of a preferred form of external filter assembly in accordance with the present invention.
Figure 2:
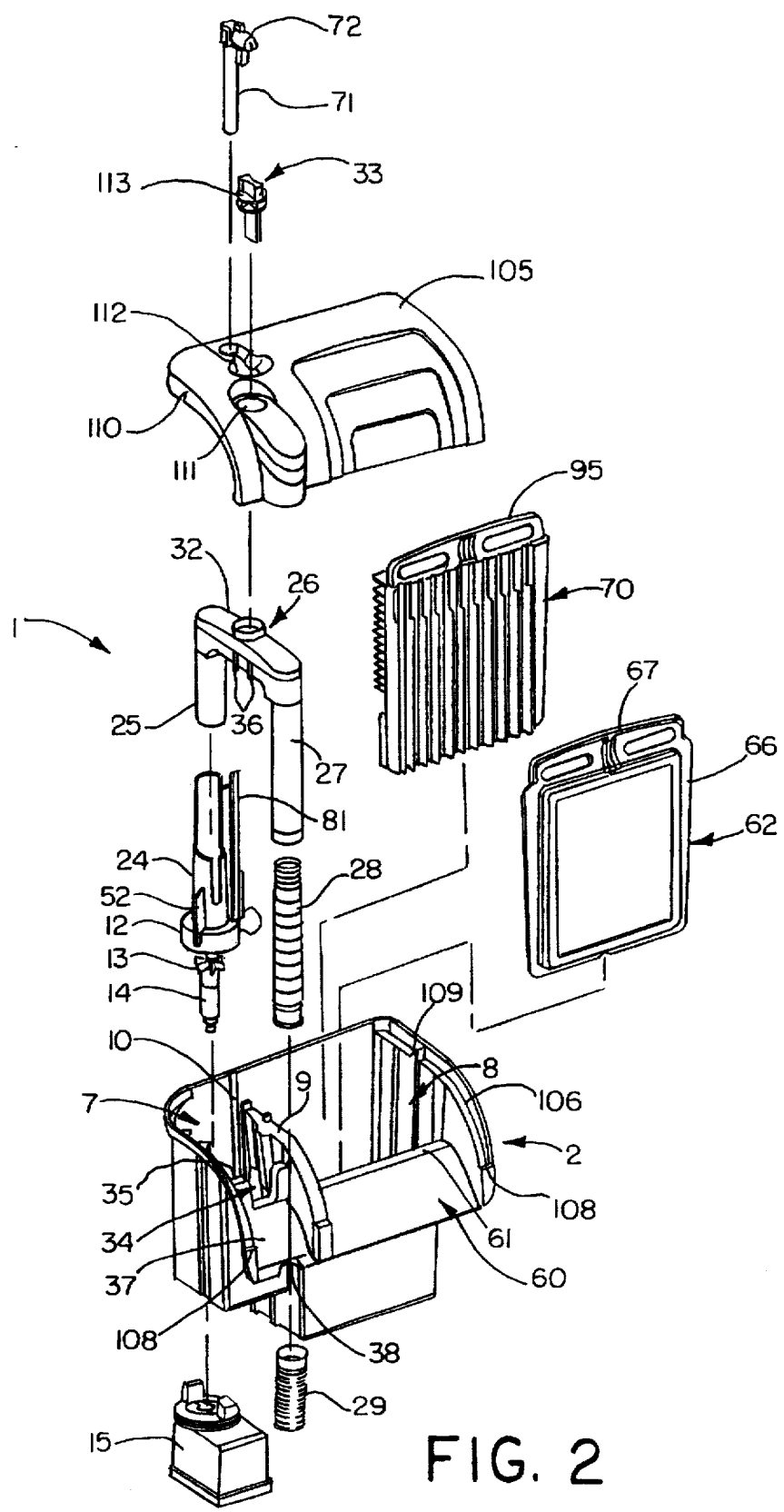
FIG. 2 is an exploded perspective view of the filter assembly of FIG. 1.

Referring now in detail to the drawings, and initially to FIGS. 1 and 2, a preferred form of external filter assembly in accordance with this invention is generally indicated by the reference numeral 1, and includes a main filter housing 2 having front and back walls 3, 4 and opposite side walls 5, 6. Within the housing 2 are a pair of laterally spaced chambers 7, 8 partially separated from each other by an intermediate wall 9 extending part way from the front wall 3 toward the back wall 4 intermediate the two side walls 5, 6, leaving a vertical opening or slot 10 (see FIGS. 2, 4 and 5) between the two chambers 7, 8 adjacent the back wall 4 for providing fluid communication between such chambers through such slot 10.

One of the chambers 7 is a water inlet chamber for receiving water from an aquarium tank T (schematically shown in FIGS. 1 and 3), whereas the other chamber 8 is a filter chamber in which the water is filtered as it circulates from the water inlet chamber through the filter chamber and back into the aquarium.

Within the water inlet chamber 7 is a housing 12 (FIG. 4) for a pump impeller 13. Depending from the impeller 13 is a rotor 14 that is rotatably driven by a power unit 15 detachably mounted to the bottom of the water inlet chamber as described hereafter. Both the impeller 13 and rotor 14 of the power unit 15 are retained on a common shaft 16 for free rotation thereon by a pair of rubber caps 17, 18 at opposite ends of the shaft. One of the caps 17 is frictionally pressed into a central bushing 19 within the impeller housing 12 for locating the impeller 13 coaxially within the housing and frictionally connecting the impeller 13 and rotor 14 to the impeller housing. The other end cap 18 is used to locate the rotor 14 within a sealed stator portion 20 of the power unit when the impeller housing 12 is properly seated in an upwardly facing groove 21 in the power unit and the cap 18 is seated at the bottom of the stator opening 22. A conventional clutch mechanism, not shown, may be provided between the impeller 13 and rotor 14 to permit the rotor to rotate a part turn before driving the impeller so that less force is required to initiate rotation of the rotor during start up of the power unit, as well known in the art.

Figure 3:
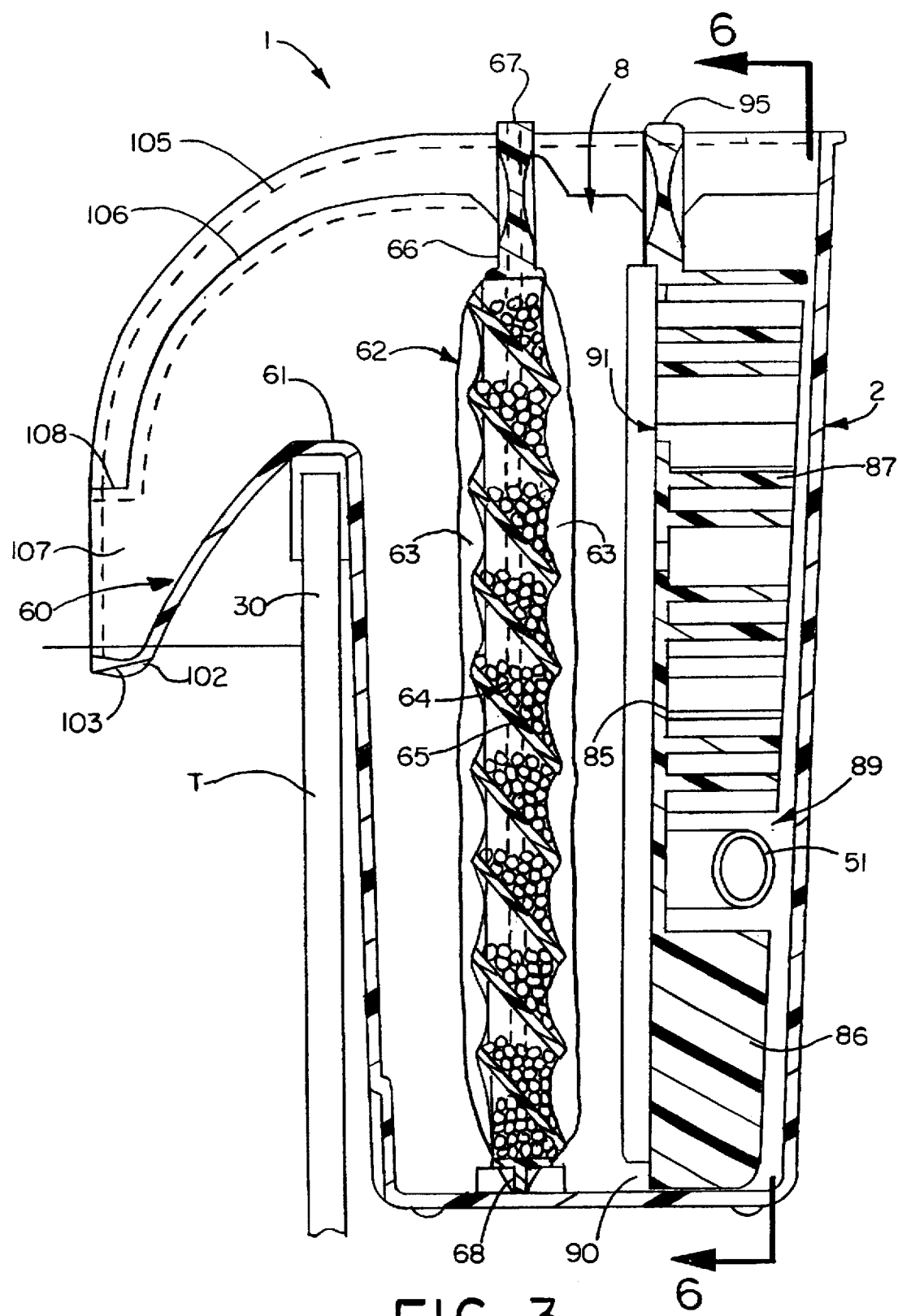
FIG. 3 is an enlarged fragmentary vertical section through the overflow or spillway and filter chamber of the filter assembly showing the filter assembly externally mounted on an upper edge of an aquarium with an upturned lip on the bottom edge of the spillway slightly below the water surface level.

Extending coaxially upwardly from the impeller housing 12 in fluid communication therewith is a tubular sleeve 24 in which one of the vertical legs 25 of a generally U-shape water siphon tube 26 is frictionally received. The other vertical leg 27 is desirably considerably longer than the first vertical leg 25. Also, a telescopic extension 28 of the siphon tube having a strainer 29 on the bottom end thereof may be telescopically inserted into the bottom open end of the vertical leg 27 to adjust the length of the siphon tube as needed making sure that the strainer is at least one inch above the bottom of an aquarium tank when the filter assembly 1 is externally mounted on the upper edge of one of the aquarium walls, normally the back wall 30, as schematically shown in FIGS. 1, 3 and 4.

The two vertical legs 25, 27 of the siphon tube 26 are integrally joined together by a horizontal leg 32 on which is mounted a flow regulator 33 for controlling the water flow rate through the filter assembly. During normal operation, the flow regulator 33 should be positioned for maximum flow through the filter system. Reduced flow may be desirable during feed times or when the input suction or output stream from the filter assembly is too strong for small or delicate fish and the like.

The horizontal leg 32 of the siphon tube 26 is desirably substantially rectangular in cross section as shown in FIGS. 1 and 2 to facilitate positioning of the horizontal leg in a correspondingly shaped slot or recess 34 in the upper front edge 35 of the water inlet chamber 7. A pair of spaced apart ribs 36 on the bottom wall of the horizontal leg 32 straddle the sides of the recess 34 to prevent the siphon tube from moving in and out when seated in the recess. Also, the bottom front side 37 of the recess 34 curves downwardly and outwardly and has a vertically oriented groove 38 in the lower edge thereof for supporting engagement by the outermost vertical leg 27 of the siphon tube 32, which like the inner vertical leg 25, is desirably generally circular in cross section.

Figure 4:
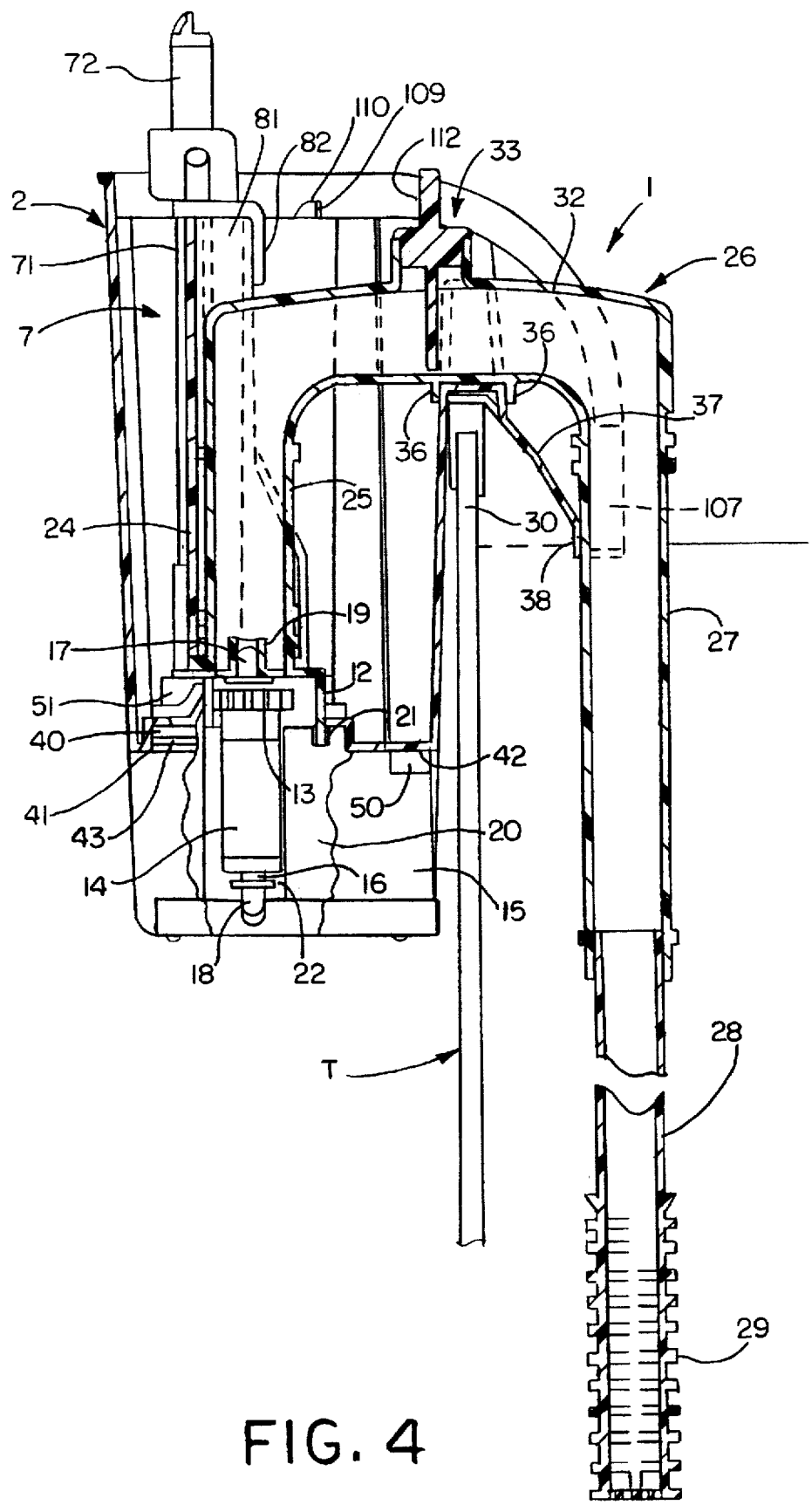
FIG. 4 is a fragmentary vertical section through the water inlet and impeller chamber of the filter assembly containing the impeller housing and venturi and showing the water siphon tube extending from the impeller housing and into the aquarium tank to the desired depth.

Referring further to FIG. 4, the power unit 15 includes an annular shoulder 40 surrounding the upper open end of the stator portion 20 having an outer diameter slightly less than the diameter of an opening 41 in the bottom wall 42 of the water inlet chamber 7 to permit insertion of the shoulder into the opening. A water tight seal is formed between the shoulder 40 and opening 41 by providing an O-ring seal 43 in a radial groove in such shoulder. To lock the power unit 15 to such bottom wall 42, a pair of spaced apart radial flanges 45 (FIG. 5) are provided adjacent the axial upper end of the bottom wall opening 41 for engagement by radial outer flanges 46 on a pair of axially upwardly extending fingers 47 on the annular shoulder 40 of the power unit 15. When the axially extending fingers 47 on the power unit are out of alignment with the radial flanges 45 adjacent the bottom wall opening 41 of the water inlet chamber 7, the fingers may be inserted upwardly through the opening until the O-ring 42 on the annular shoulder 40 sealingly engages the wall of the opening and the power unit rests up against the bottom side of the bottom wall 42 (see FIG. 4). When thus positioned, the power unit 15 may be rotated 90° to cause the radial flanges 46 on the fingers 47 to radially overlap the radial flanges 45 surrounding the bottom wall opening 41, thus providing a bayonet type lock for locking the power unit in place. A stop 50 (FIG. 4) on the bottom wall 42 is engaged by the power unit when the power unit is rotated to the fully locked position.

With the power unit 15 firmly locked in place on the bottom of the water inlet chamber 7, the impeller housing 12 may be inserted into the water inlet chamber 7 from the top until the rotor portion 14 of the power unit, which along with the pump impeller 13 is suspended from the impeller housing 12, is properly seated within the stator portion 20 of the power unit and the lower edge of the impeller housing is received in the upwardly facing groove 21 in the power unit. During insertion of the impeller housing 12 into the water inlet chamber 7, the impeller housing 12 must be oriented so that the radial discharge port 51 of the impeller housing 12 extends radially into the vertical opening 10 between the water inlet and filter chambers 7, 8. Correct orientation of the impeller housing within the water inlet chamber is obtained by providing a radial flange 52 on the tubular sleeve portion 24 of the impeller housing which slidingly engages a vertical guide slot 53 in one side of the water inlet chamber and another radial flange 54 on the water discharge port 51 defining a V-shaped slot 55 therebetween which slidingly engages a vertical rib 56 on the back wall of the filter housing adjacent the vertical opening 10 between the two chambers.

The water exiting the impeller housing discharge port 51 is discharged into the filter chamber 8 where the water is mechanically and/or chemically filtered before the water is recirculated back to the aquarium tank through an overflow or spillway 60 at the front of the filter chamber. The top 61 of the spillway is below the top edges of the back and side walls 4–6 of the filter housing 2 as well as the bottom of the recess 34 in the upper front edge 35 of the water inlet chamber 7 which receives the horizontal leg of the siphon tube.

In the preferred embodiment disclosed herein, a combined mechanical and chemical filter 62 is provided which as shown in FIG. 3 includes two fabric layers 63 that enclose activated carbon 64 in a single, convenient cartridge that is easy to install and replace. Any suitable fabric may be used for the mechanical filtration material such as a polyester fabric that effectively traps uneaten food, loose bits of plants or algae, and solid animal wastes. The collected waste particles are held tightly within the fabric structure, permitting efficient removal of wastes when the filter cartridge 62 is changed.

To enhance the efficiency of the activated carbon 64, the activated carbon is supported between the two layers of fabric 63 by a series of vertically spaced upwardly sloping baffles 65 that more evenly distribute the carbon over the entire height of the filter cartridge 62 from top to bottom, thus assuring that more water will contact the carbon on every pass through the filter, resulting in cleaner, clearer aquarium water, and a healthier aquarium for its inhabitants.

The baffles 65 are supported at their ends by a rectangular plastic frame 66 that also supports the peripheral edges of the fabric layers which cover the front and back edges of the baffles thus trapping the relatively evenly distributed carbon particles between the baffles. This prevents the carbon particles from piling up adjacent the bottom of the filter cartridge and causes the carbon particles to collect adjacent the lower sides of the baffles thus substantially completely filling the spaces between the baffles with carbon particles as schematically shown in FIG. 3.

At the top of the filter cartridge frame 66 is a handle 67 which may easily be grasped by one hand for ease of insertion of the cartridge 62 into a pair of guide slots 68 (see FIG. 5) on opposite sides of the filter chamber 8 and for removal and replacement as needed.

Also mounted in the filter chamber 8 upstream of the mechanical/chemical filter 62 is a functionally active filter cartridge 70 which, as used in the claims, means a filter for performing a desired active filtration function, such as biological filtration (including but not limited to fluidized bed filtration), protein skimming, ultraviolet sterilization, or denitrification. Locating the active filtration cartridge 70 upstream of the mechanical/chemical filter 62 has the advantage that the mechanical/chemical filter will not filter out any of the oxygen in the water before the water passes through the active filtration cartridge which will improve the performance of the active filtration cartridge.

The amount of undissolved oxygen in the water may be increased to further improve the efficiency of the active filter 70 by mixing fresh air with the water before the water passes through the active filter. In the preferred embodiment disclosed herein, the aquarium water is aerated immediately upstream of the filter cartridge 70 by providing a venturi tube 71 in fluid communication with a restricted passage in the impeller discharge port 51. The venturi tube 71 extends upwardly from the impeller discharge port above the top of the water inlet chamber 7 where it is exposed to the atmosphere thus allowing air to be drawn through the tube and mixed with the water passing through the impeller discharge port.

In some instances it may be desirable to turn the venturi off to eliminate the sound that is produced during aeration of the water. To that end, a flip-type valve 72 (FIG. 7) is pivotally mounted on the upper end of the venturi tube 71. At the bottom of the valve 72 is a spherical ball 73 that seats against an O-ring seal 74 surrounding an opening 75 in the upper end of the venturi tube.

Figure 7:
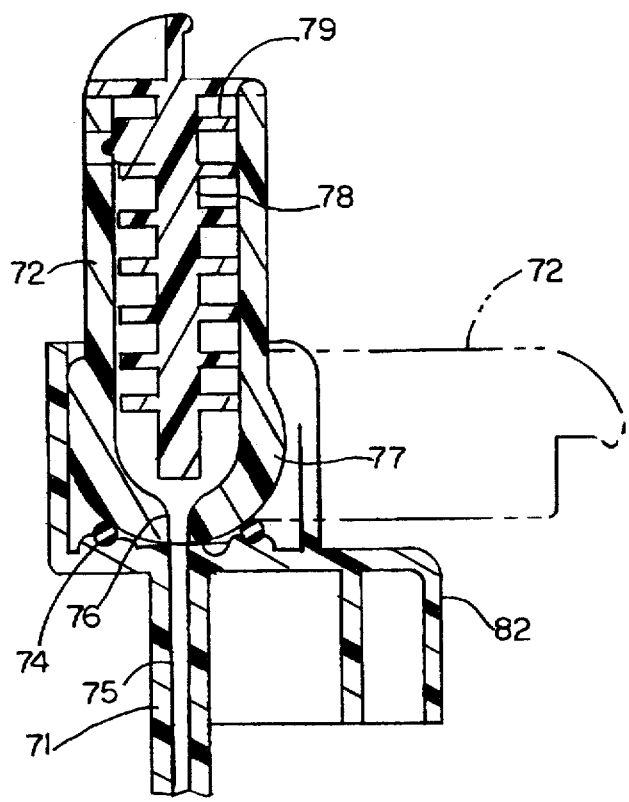
FIG. 7 is an enlarged longitudinal section through a shut-off valve on the upper end of the venturi tube showing the valve in solid lines in the up or open position and in phantom lines in the down or closed position.

When the valve 72 is in the up position shown in FIG. 7, a central passage 76 in the valve communicates with the opening 75 in the venturi tube, thus providing fluid communication between the venturi tube 71 and the atmosphere through the valve 72. However, when the valve 72 is pivoted/flipped down to the phantom line position shown in FIG. 7, the passage 76 in the valve is moved out of communication with the opening 75 in the venturi tube and air flow through the venturi tube is blocked by a nonapertured portion 77 of the ball valve engaging the O-ring seal 74, thus closing off the venturi.

An insert 78 having a series of axially spaced apart annular discs 79 may be inserted into the outer end of the valve 72 to help muffle the sound of the air passing through the valve. However, the venturi will still make some noise when operating. Accordingly, there may still be instances when it is desirable to turn the venturi off. The active filter cartridge 70 will still function even without air injection, but the additional mixing of fresh air with the water before the water passes through the active filter cartridge will improve its performance and efficiency.

The venturi tube 71 is removably attached to the pump impeller housing 12 for ease of removal for cleaning of the various parts, and is oriented when installed so that the valve 72 may be flipped up and down from the front of the aquarium for ease of operation. To that end, an upwardly facing socket 80 (FIG. 6) is provided on the top of the water discharge port 51 for sliding receipt of the lower end of the venturi tube 71. Also, a vertically extending rib 81 is provided on the side of the tubular sleeve 24 of the impeller housing 12 for sliding receipt in an opening on the bottom of a shoulder 82 on the venturi tube adjacent the upper end thereof (see FIG. 4).

Figure 5:
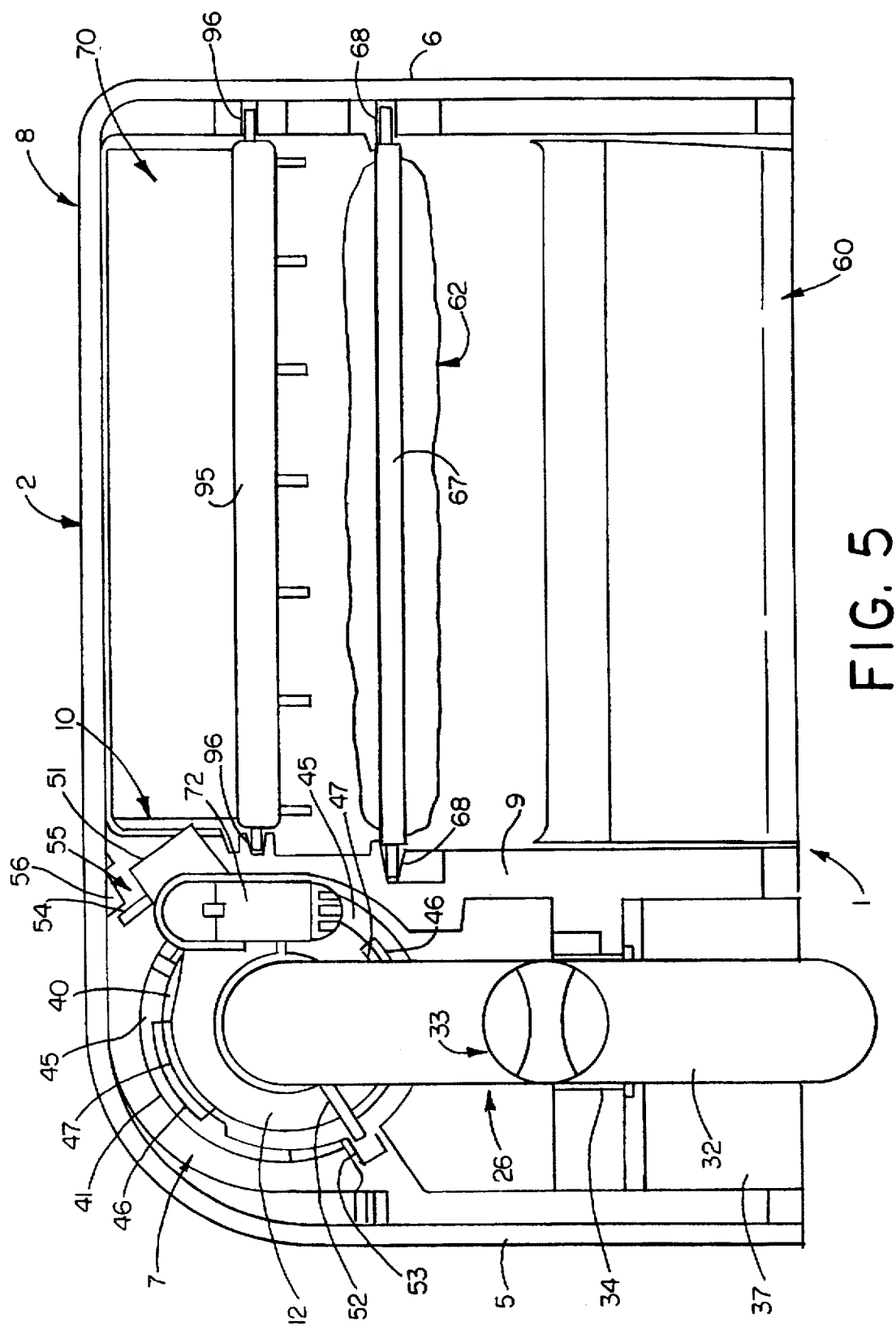
FIG. 5 is an enlarged top plan view of the filter assembly of FIG. 1.
Figure 6:
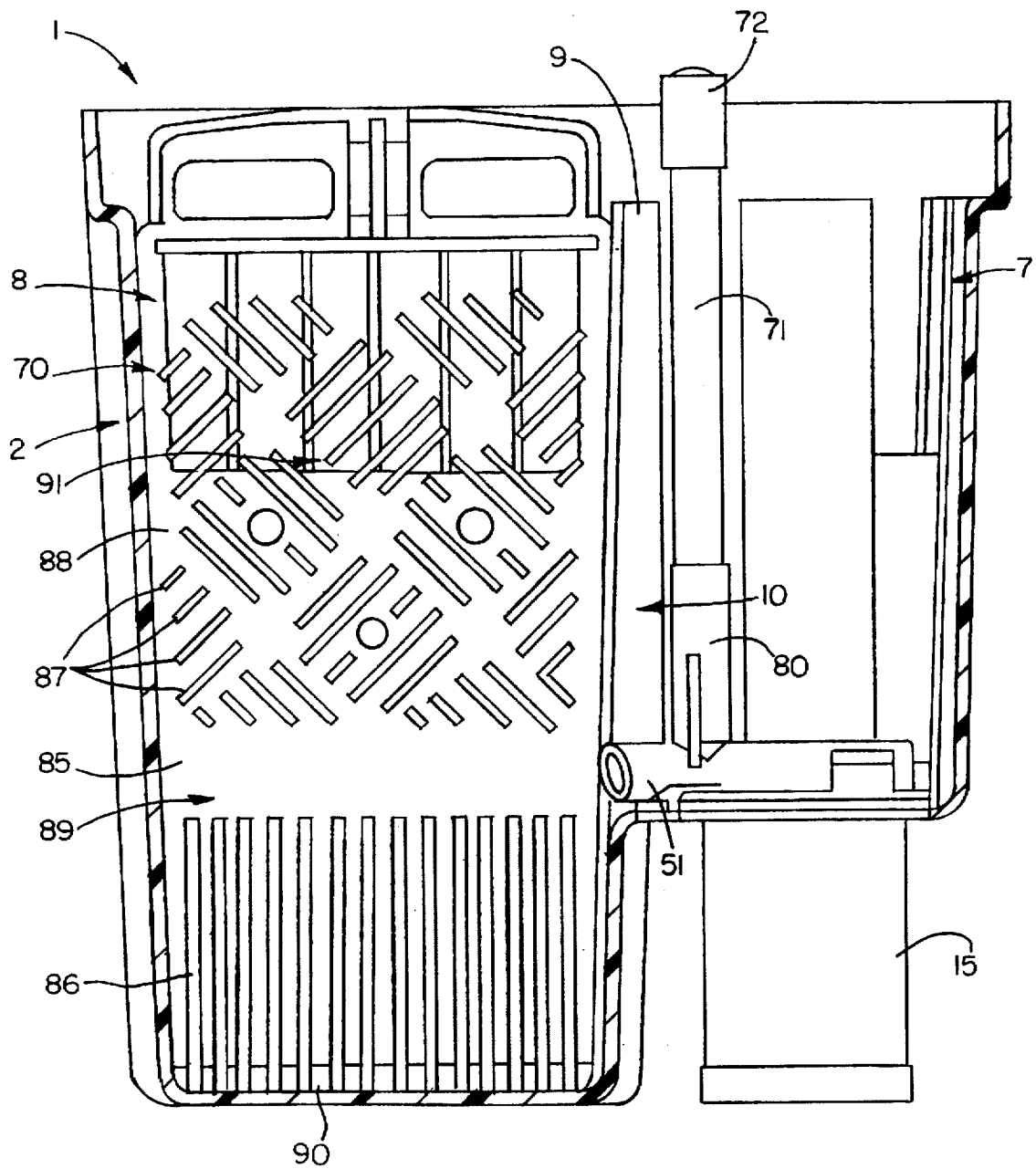
FIG. 6 is a somewhat reduced transverse vertical section through the filter assembly of FIG. 3 showing the back or upstream side of a biological filtration cartridge in elevation.

In the embodiment shown in FIGS. 3, 5 and 6, the active filtration cartridge 70 comprises a biological filter plate 85 having a series of rearwardly projecting fins or vanes 86, 87 on the back or rearwardly facing side 88 of the plate 85 to provide a high surface area for support of nitrifying bacteria for oxidizing toxic ammonia to relatively non-toxic nitrate.

The vanes 86, 87 are arranged in two different groups or sets adjacent the upper and lower ends of the back side of the plate 85, leaving a horizontal pathway 89 therebetween for the flow of water from the impeller discharge port 51. The lower series of vanes 86 are desirably generally vertically oriented and extend a short distance below the bottom of the plate, for example, approximately one-quarter inch, to provide a fluid passageway 90 beneath the plate 85 to allow a portion of the water entering the filter chamber 8 to pass downwardly between the vertical vanes 86 and underneath the plate.

The upper series of fins or vanes 87 are generally shorter than the lower vanes 86, and are greater in number. Also, they are arranged, for example, in groups of three to five parallel spaced apart vanes 87, with the vanes in adjacent groups extending at right angles relative to each other. For example, alternate groups of vanes 87 may extend at 45° and 135°, respectively as measured from the vertical to provide a "basket weave" pattern which produces areas of fast and slow moving water as the water entering the filter chamber 8 moves up between the upper series of vanes and out through openings 91 in the upper portion of the plate 85 which begin at a level approximately corresponding to the top edge of the spillway 60 at the front of the filter chamber.

As the mixture of air and water passes from the water inlet chamber 7 into the filter chamber 8 and through the biological filter 70, the biologically active surfaces of the filter plate 85 are directly exposed both to the dissolved oxygen in the water as well as the undissolved oxygen which produces a "wet/dry" action that provides the nitrifying bacteria with much more oxygen that would otherwise be available, significantly improving both the efficiency and capacity of the biological filter. As previously indicated, there may be times when the injection of air through the venturi 71 may be turned off for noise reasons. The biological filter 70 will still function without air injection, but not at the same high degree of performance and efficiency.

The biological filter 70, like the mechanical/chemical filter 62, is a cartridge type filter, and has a handle 95 at its upper end to facilitate insertion of the filter into a second pair of slots 96 in the filter chamber 8 upstream of the slots 68 for the mechanical/chemical filter. Making the functionally active filter 70 totally separate from the mechanical/chemical filter 62 has the advantage that the function of the active filter will be preserved when the mechanical/chemical filter is replaced.

Under normal operating conditions, cleaning of the biological filter 70 is unnecessary, in that it is designed for flow of particulate matter through the filter which is subsequently filtered out by the mechanical filter 62 downstream of the biological filter. However, should it become necessary to clean accumulated large particles or the like from the biological filter, the biological filter can be removed and gently rinsed in a bowl of aquarium water, taking care not to destroy any biological filter organisms, and reinstalled as before.

Constructing the active filter so that it is a removable cartridge also has the advantage that one type of functionally active cartridge may be replaced with another for performing a different active filtration function, for example, in lieu of biological filtration, protein skimming, ultraviolet sterilization, and denitrification.

Figure 8:
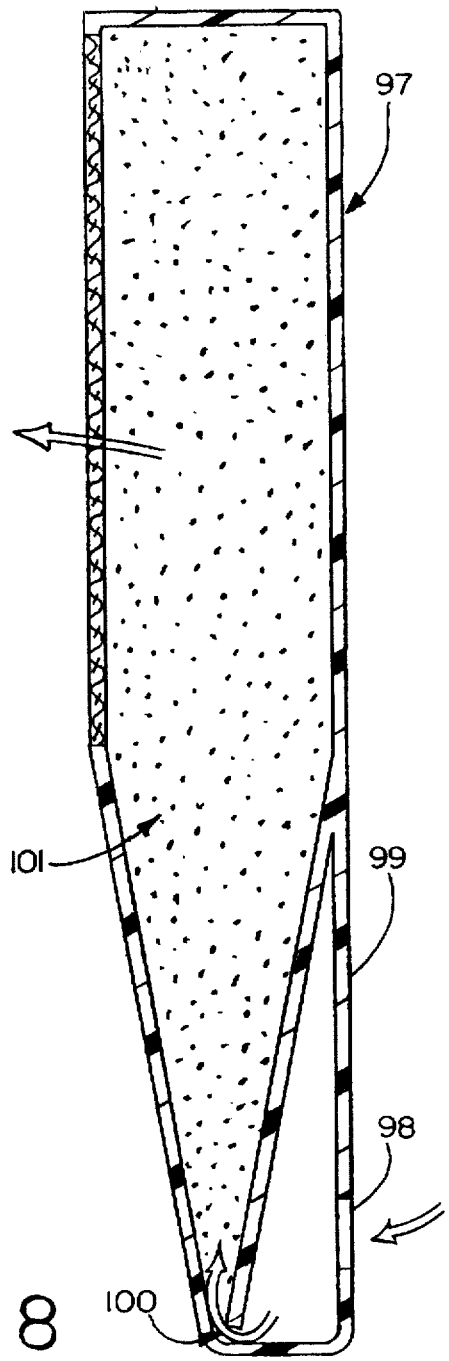
FIG. 8 is a vertical section through a fluidized bed filtration cartridge which may be substituted for the biological filtration cartridge shown in FIGS. 1-3 and 5.

FIG. 8 shows an example of another functionally active biological filter in the form of a fluidized bed filtration cartridge 97 having a water inlet 98 on the upstream or lower back side 99 and a V-slot 100 adjacent the bottom through which the water is pumped for suspending sand or other fine filter medium 101 within the cartridge to provide a very high surface area for growth of filtering bacteria to which the mixture of air and water is directly exposed during passage through the cartridge.

To install the filter assembly 1, the filter assembly is externally mounted on the aquarium tank by hooking the overflow or spillway 60 over the upper edge of the tank with the bottom edge 102 of the spillway extending into the tank. Most often the filter assembly is installed at the rear of the aquarium. The water level in the aquarium should be filled as close to the top as possible before installing the filter assembly. When properly installed, the bottom edge 102 of the spillway or overflow 60 should be at or slightly below the water surface level so that a turned up lip 103 on the bottom edge, schematically shown in FIG. 3, will cause increased turbulence at the water surface during circulation of the aquarium water through the filter assembly.

Next the telescopic siphon tube 28 is adjusted to the desired height, making sure the strainer 29 at the bottom of the tube is at least an inch above the gravel in the bottom of the aquarium. Also, the flow regulator 33 on the siphon tube 26 should be positioned to the maximum flow position to permit maximum flow through the filter assembly, except possibly during feed times or when the input suction or output stream is too strong for small or delicate fish or the like.

Before plugging in/turning on the power unit 15, care should be taken to make certain that the mechanical/chemical filter cartridge 62 is inserted into the appropriate guide slots 68 in the filter chamber 8 and slid completely to the bottom. Similarly, care should be taken to make certain the biological filter or other functionally active filtration cartridge 70 is inserted into its guide slots 96 in the filter chamber and slid all the way down into position before start up.

Next a sufficient amount of the aquarium water should be poured into the water inlet chamber 7 to completely cover the impeller housing 12 for priming the pump. Then a cover 105 is desirably placed over the top of the filter housing 2 to prevent possible splashing of the water out of the filter assembly during operation. The cover 105, which is supported on the housing 2 by ledges 106 on the inner surfaces of the housing side walls 5, 6, curves downwardly toward the front to conform to the shape of the downturned spillway 60 and adjacent downwardly curved front side 37 of the water inlet chamber, leaving a sufficient space or gap 107 (FIGS. 3 and 4) between the interior of the cover and spillway to provide for the unobstructed flow of aquarium water over the spillway.

Suitable stops 108 are provided at the curved lowermost ends of the housing ledges 106 for supporting the lowermost corners of the cover against the stops. Also, vertical tabs 109 are provided on the ledges 106 intermediate their lengths for engagement in slots 110 in the cover (see FIGS. 2 and 4) to prevent the cover from accidentally sliding off the housing.

Suitable openings 111 and 112 (FIG. 2) are provided in the cover for both the flow regulator control knob 113 and venturi valve 72 to permit control of the water flow through the siphon tube and air flow through the venturi without having to remove the cover. Both the filter housing and cover as well as the siphon tube are desirably made out of a transparent plastic material to allow for visual inspection of the water flow through the filter assembly without having to remove the cover.

When needed, the mechanical/chemical filtration cartridge 62 can readily be replaced while the filter assembly 1 is running by removing the cover 105 and pulling the chemical/mechanical filter cartridge out of the filter chamber and replacing it with a new one.

Should there be a need to clean the siphon tube 26 without cleaning the other parts within the water inlet chamber 7, the siphon tube can be removed by itself by holding the venturi valve 72 in place with one hand, and with the other hand, pulling the siphon tube up and out. Also, the venturi tube 71 together with the venturi valve 72 can be removed separately by holding the siphon tube 26 and/or impeller housing 12 in place with one hand and pulling up and out on the venturi tube with the other hand. With both the siphon tube 26 and venturi tube 71 removed, the impeller housing 12 can also be removed if desired. Alternatively, the siphon tube, venturi tube and impeller housing can all be removed as a single unit by pulling up and out on the impeller housing with the siphon tube and venturi tube still in place. Of course, the power unit 15 should be unplugged before performing these various disassembly/cleaning operations.

Under normal circumstances, removal of the power unit 15 is unnecessary. However, if it should become desirable to remove the power unit, the impeller housing 12 must first be removed, since when in place it acts as a stop preventing turning of the power unit to the unlocked position.

Before removing the power unit 15, all of the parts should be removed from the filter housing and the housing inverted to empty any remaining water in the housing. To remove the power unit, the power unit is turned 90° relative to the housing to bring the flanges 46 on the power unit fingers 47 out of overlapping engagement with the flanges 46 in the bottom wall 42 of the water inlet chamber 7 and pulled straight out. Before reassembling the power unit, the O-ring seal 42 should be wetted to make sure it provides a proper seal with the opening 41 in the bottom wall of the water inlet chamber.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the claims.

What is claimed is:

1. An external filter assembly for an aquarium comprising a filter housing containing a water inlet chamber for receiving water from the aquarium, and a filter chamber for receiving the water from said water inlet chamber and returning the water to the aquarium, said filter chamber containing a mechanical filter for removing waste particles from the water, and a functionally active biological filter upstream of said mechanical filter for actively filtering the water before the water is filtered by said mechanical filter, said functionally active biological filter having passages for flow of particulate material through said functionally active biological filter which is subsequently filtered out by said mechanical filter downstream of said functionally active biological filter.

2. The filter assembly of claim 1 wherein said functionally active biological filter comprises a functionally active filter cartridge which is removable from said filter chamber independently of said mechanical filter.

3. The filter assembly of claim 2 wherein said functionally active biological filter comprises any one of a plurality of different types of functionally active filter cartridges adapted for insertion in and removal from said filter assembly.

4. The filter assembly of claim 3 wherein said filter chamber has guide slots for sliding receipt of any one of said functionally active filter cartridges into said filter chamber.

5. The filter assembly of claim 3 wherein one of said functionally active filter cartridges is a fluidized bed filter.

6. The filter assembly of claim 1 wherein said mechanical filter comprises a mechanical filter cartridge which is removable from said filter chamber independently of said functionally active biological filter thus permitting replacement of said mechanical filter cartridge without disturbing said functionally active biological filter.

7. The filter assembly of claim 6 wherein said functionally active biological filter comprises a functionally active filter cartridge which is removable from said filter chamber independently of said mechanical filter cartridge whereby either of said filter cartridges may be replaced without disturbing the other filter cartridge.

8. The filter assembly of claim 7 wherein said filter chamber includes two sets of vertical guide slots, one set for each of said filter cartridges.

9. The filter assembly of claim 1 further comprising a pump for pumping aquarium water from said water inlet chamber into said filter chamber, and an aerator for mixing fresh air with the aquarium water in said water inlet chamber.

10. The filter assembly of claim 9 wherein said pump comprises an impeller, an impeller housing surrounding said impeller, said impeller housing having a water inlet and a water discharge port, and said aerator comprising a venturi tube providing communication between said water discharge port and the atmosphere.

11. The filter assembly of claim 10 further comprising a pivotally mounted air valve at an upper end of said venturi tube, said air valve being pivotable between a first position for allowing air flow through said venturi tube into said water discharge port and a second position blocking such air flow.

12. The filter assembly of claim 10 further comprising a siphon tube providing fluid communication between said water inlet and the interior of the aquarium, said siphon tube including a pair of vertical legs interconnected by a horizontal leg, and a flow regulator in said horizontal leg for controlling the water flow rate through said filter assembly.

13. The filter assembly of claim 12 wherein said venturi tube and said siphon tube are each slidably detachable from said impeller housing for removal of said venturi tube and said siphon tube independently of said impeller housing, and said impeller housing and said venturi tube and said siphon tube are also removable from said water inlet chamber as a unit.

14. The filter assembly of claim 1 wherein said filter chamber includes a forwardly facing spillway for directing filtered water from said filter assembly back into the aquarium, said spillway having a bottom edge that extends down to approximately the water surface level within the aquarium when said spillway is hooked over an upper edge of the aquarium for externally mounting said filter assembly to the aquarium, said bottom edge of said spillway having a turned up lip to cause increased turbulence at the water surface within the aquarium during circulation of the water from said filter assembly back into the aquarium.

15. The filter assembly of claim 1 further comprising a pump impeller in said water inlet chamber for circulating water between the aquarium and said filter chamber, an impeller housing surrounding said pump impeller, and a power unit mounted on a bottom wall of said water inlet chamber for driving said pump impeller.

16. The filter assembly of claim 15 wherein said power unit includes a stator and rotor for driving said pump impeller, said pump impeller and rotor being suspended from said impeller housing, and said pump impeller and said rotor being removable from said water inlet chamber as a unit.

17. The filter assembly of claim 15 wherein said power unit is detachably mounted to said bottom wall of said water inlet chamber by rotating said power unit between a first position for locking said power unit to said bottom wall and a second position for unlocking said power unit from said bottom wall, said impeller housing interfering with such rotation of said power unit, thus requiring said impeller housing to be removed from said water inlet chamber before said power unit can be rotated to the unlocked position.

18. A mechanical and chemical filter for an external filter assembly for an aquarium comprising two fabric layers for providing mechanical filtration of waste particles from the aquarium water and activated carbon disposed between said fabric layers to provide chemical filtration of the water, said carbon being supported by a series of vertically spaced baffles angled upwardly from back to front between said fabric layers to provide a relatively uniform distribution of said carbon throughout substantially the height of said filter.

19. The filter of claim 18 further comprising a rectangular frame for supporting opposite ends of said baffles, said fabric layers being attached to said frame outwardly of said ends of said baffles.

20. A biological filter cartridge for an external filter assembly for an aquarium comprising a biological filter plate having plural groups of vanes projecting from one side of said plate, each of said groups comprising a plurality of parallel spaced apart vanes, with the vanes in adjacent groups extending at angles relative to each other to produce areas of fast and slow moving water through said biological filter for promoting a wide range of biological filtration organisms, said filter plate having openings in an upper portion of said filter plate to provide a flow path for the water through said filter plate.

21. The cartridge of claim 20 wherein said filter plate also has a series of other vanes projecting outwardly from said one side of said filter plate and extending vertically below a bottom edge of said filter plate to provide a an other flow path for the water beneath said filter plate.

22. The cartridge of claim 21 wherein said series of other vanes are vertically spaced from said groups of vanes leaving a horizontal flow path between said groups of vanes and said series of other vanes.

23. An external filter assembly for an aquarium comprising a filter housing containing a water inlet chamber for receiving water from the aquarium, and a filter chamber for receiving the water from said water inlet chamber and returning the water to the aquarium, said filter chamber containing a mechanical filter for removing waste particles from the water, and a functionally active filter upstream of said mechanical filter for actively filtering the water before the water is filtered by said mechanical filter, said functionally active filter comprising a biological filter plate having plural groups of vanes projecting from a back side of said filter plate facing upstream in the direction from which water flows within said filter chamber, each of said groups comprising a plurality of parallel spaced apart vanes, with the vanes in adjacent groups extending at angles relative to each other to produce areas of fast and slow moving water through said biological filter for promoting a wide range of biological filtration organisms, said filter plate having openings in an upper portion of said filter plate to provide a flow path for the water through said filter plate.

24. The filter assembly of claim 23 wherein said filter plate has a series of other vanes on said back side of said filter plate facing upstream in the direction from which water flows within said filter chamber, said other vanes being arranged in vertically spaced relation and extending below a bottom edge of said filter plate to provide an other flow path for the water beneath said filter plate.

25. The filter assembly of claim 24 wherein said series of other vanes are vertically spaced from said plural groups of vanes leaving a horizontal flow path between said groups of vanes and said series of other vanes, the water from said water inlet chamber being introduced into said filter chamber at said horizontal flow path in said filter chamber.

26. The filter assembly of claim 25 further comprising a pump impeller in said water inlet chamber for drawing aquarium water into said water inlet chamber and pumping the water directly into said horizontal flow path in said filter chamber.

27. The filter assembly of claim 26 further comprising an impeller housing surrounding said pump impeller, said impeller housing having an inlet port for the aquarium water and a discharge port for directing the aquarium water horizontally from said water inlet chamber into said horizontal flow path in said filter chamber.

28. An external filter assembly for an aquarium comprising a filter housing containing a water inlet chamber for receiving water from the aquarium, and a filter chamber for receiving the water from said water inlet chamber and returning the water to the aquarium, said filter chamber containing a mechanical filter for removing waste particles from the water, and a functionally active filter upstream of said mechanical filter for actively filtering the water before the water is filtered by said mechanical filter, said mechanical filter including two fabric layers to provide mechanical filtration of waste particles in the water and activated carbon disposed between said fabric layers to provide chemical filtration of the water, said carbon being supported by a series of vertically spaced baffles angled upwardly from back to front between said fabric layers to provide a relatively uniform distribution of said carbon throughout substantially the height of said mechanical filter.

29. The filter assembly of claim 28 wherein said mechanical filter is in the form of a cartridge that is slidably received in vertical guides in said filter chamber, said cartridge including a rectangular frame for supporting opposite ends of said baffles, said fabric layers being attached to said frame outwardly of said ends of said baffles.

* * * * *